United States Patent
Bircher et al.

(10) Patent No.: US 9,720,487 B2
(45) Date of Patent: Aug. 1, 2017

(54) PREDICTING POWER MANAGEMENT STATE DURATION ON A PER-PROCESS BASIS AND MODIFYING CACHE SIZE BASED ON THE PREDICTED DURATION

(71) Applicant: Advanced Micro Devices, Inc., Sunnyvale, CA (US)

(72) Inventors: William L. Bircher, Austin, TX (US); Madhu Saravana Sibi Govindan, Austin, TX (US); Manish Arora, Dublin, CA (US); Michael J. Schulte, Austin, TX (US); Nuwan S. Jayasena, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 202 days.

(21) Appl. No.: 14/152,826

(22) Filed: Jan. 10, 2014

(65) Prior Publication Data

US 2015/0198991 A1 Jul. 16, 2015

(51) Int. Cl.
*G06F 1/32* (2006.01)

(52) U.S. Cl.
CPC ............ *G06F 1/3243* (2013.01); *G06F 1/329* (2013.01); *G06F 1/3287* (2013.01); *Y02B 60/1239* (2013.01); *Y02B 60/1282* (2013.01); *Y02B 60/144* (2013.01)

(58) Field of Classification Search
CPC ...... G06F 9/5033; G06F 1/324; G06F 1/3296; G06F 1/3243
See application file for complete search history.

(56) References Cited

U.S. PATENT DOCUMENTS

| | | | |
|---|---|---|---|
| 5,758,143 A | 5/1998 | Levitan | |
| 6,457,134 B1 * | 9/2002 | Lemke | G06F 1/3203 713/323 |
| 7,143,273 B2 | 11/2006 | Miller | |
| 7,266,707 B2 | 9/2007 | Ngo | |
| 7,490,302 B1 | 2/2009 | Rahman | |
| 7,868,479 B2 | 1/2011 | Subramaniam | |
| 8,245,065 B2 | 8/2012 | Niggemeier | |
| 8,949,554 B2 | 2/2015 | Sadowski et al. | |
| 9,176,572 B2 | 11/2015 | Thomson | |
| 9,183,144 B2 | 11/2015 | Wang | |
| 2003/0093653 A1 | 5/2003 | Oga | |

(Continued)

FOREIGN PATENT DOCUMENTS

EP 2047354 3/2011

OTHER PUBLICATIONS

U.S. Appl. No. 14/310,908, filed Jun. 20, 2014, entitled "Decoupled Entry and Exit Prediction for Power Gating".

(Continued)

*Primary Examiner* — Thomas Lee
*Assistant Examiner* — Santosh R Poudel

(57) ABSTRACT

Durations of power management states are predicted on a per-process basis. Some embodiments include storing, in one or more data structures associated with one or more processes, information indicating previous durations of a power management state associated with the process(es). Some embodiments also include predicting a subsequent duration of the power management state for the process(es) using information stored in the data structure(s).

18 Claims, 9 Drawing Sheets

(56) References Cited

U.S. PATENT DOCUMENTS

| | | |
|---|---|---|
| 2006/0184287 A1 | 8/2006 | Belady |
| 2006/0248436 A1 | 11/2006 | LaFrance-Linden et al. |
| 2007/0288414 A1 | 12/2007 | Barajas |
| 2008/0209243 A1 | 8/2008 | Ghiasi et al. |
| 2008/0276238 A1* | 11/2008 | Levanoni ............ G06F 9/5083 718/100 |
| 2009/0150696 A1 | 6/2009 | Song |
| 2009/0158067 A1 | 6/2009 | Bodas et al. |
| 2009/0235105 A1 | 9/2009 | Branover et al. |
| 2010/0058078 A1 | 3/2010 | Branover et al. |
| 2010/0107174 A1* | 4/2010 | Suzuki ................ G06F 9/5033 718/104 |
| 2010/0138456 A1 | 6/2010 | Aghili |
| 2010/0145896 A1 | 6/2010 | Yuta |
| 2010/0169683 A1* | 7/2010 | Wang .................. G06F 1/3203 713/323 |
| 2010/0287394 A1 | 11/2010 | Branover et al. |
| 2011/0040995 A1* | 2/2011 | Basak .................. G06F 1/3203 713/324 |
| 2011/0078478 A1 | 3/2011 | Branover et al. |
| 2011/0153536 A1 | 6/2011 | Yang |
| 2011/0161627 A1* | 6/2011 | Song .................... G06F 1/3203 712/30 |
| 2011/0291748 A1 | 12/2011 | Li et al. |
| 2012/0173907 A1* | 7/2012 | Moses .................. G06F 1/3225 713/321 |
| 2013/0007494 A1 | 1/2013 | Branover et al. |
| 2013/0080813 A1 | 3/2013 | Tarui |
| 2013/0097415 A1 | 4/2013 | Li et al. |
| 2013/0097443 A1 | 4/2013 | Li |
| 2013/0185570 A1 | 7/2013 | Kumar |
| 2013/0238628 A1 | 9/2013 | Behnen et al. |
| 2014/0006817 A1 | 1/2014 | Bonen |
| 2014/0086406 A1 | 3/2014 | Polzin et al. |
| 2014/0089697 A1 | 3/2014 | Kim |
| 2014/0095896 A1 | 4/2014 | Carter |
| 2014/0149772 A1 | 5/2014 | Arora et al. |
| 2014/0173206 A1 | 6/2014 | Wang et al. |
| 2014/0181553 A1* | 6/2014 | Eckert .................. G06F 1/3234 713/323 |
| 2014/0181556 A1* | 6/2014 | Eckert .................... G06F 1/324 713/323 |
| 2014/0380072 A1 | 12/2014 | Lee |
| 2015/0067357 A1 | 3/2015 | Arora |
| 2015/0067700 A1* | 3/2015 | Kim ...................... G06F 9/4881 718/107 |
| 2015/0100810 A1* | 4/2015 | Sreekumaran ........ G06F 1/3268 713/324 |
| 2015/0170048 A1 | 6/2015 | Lin |
| 2015/0170049 A1 | 6/2015 | Mann |
| 2015/0198991 A1 | 7/2015 | Bircher |

OTHER PUBLICATIONS

U.S. Appl. No. 14/488,874, filed Sep. 17, 2014, listing Fulya Kaplan, et al. as inventors, entitled "Predictive Management of Heterogeneous Processing Systems".
Final Office Action mailed Dec. 14, 2015 for U.S. Appl. No. 14/015,578, 20 pages.
Canturk Isci et al., "Live, Runtime Phase Monitoring and Prediction on Real Systems with Application to Dynamic Power Management", MICRO-39. 39th Annual IEEE/ACM International Symposium on Microarchitecture, Oct. 9, 2006, 12 pages.
William Lloyd Bircher et al., "Predictive Power Management for Multi-Core Processors", WEED 2010—Workshop on Energy-Efficient Design, Jun. 1, 2010, 7 pages.
Yuki Abe et al., "Power and Performance Analysis of GPU-Accelerated Systems", USENIX, HotPower'12, 2012, 6 pages.
Non-Final Office Action mailed Oct. 16, 2015 for U.S. Appl. No. 14/488,874, 21 pages.
Ravi Kokku, et al., "Adaptive Processor Allocation in Packet Processing Systems", 2004, 14 pages.
U.S. Appl. No. 13/723,868, filed Dec. 21, 2012, entitled "Idle Phase Prediction for Integrated Circuits".
2nd Generation Intel Core Processor Family Desktop: Datasheet, vol. 1, Supporting Intel Core i7, i5 and i3 Desktop Processor Series, Intel, Sep. 2012, 112 pages.
International Search Report and Written Opinion in International Application No. PCT/US2013/075311, mailed Apr. 23, 2014, 12 pages.
Zhigang Hu et al, "Microarchitectural Techniques for Power Gating of Execution Units", ISLPED '04, Aug. 9, 2014, 6 pages.
"BIOS and Kernel Developer's Guide (BKDG) for AMD Family 15 H Models 00h-0Fh Processors", Jan. 23, 2013, 639 Pages.
U.S. Appl. No. 61/730,614, filed Nov. 28, 2012, entitled "Linear Prediction Based on Power Gating Entry Decisions".
U.S. Appl. No. 14/063,194, filed Dec. 25, 2013, entitled "Global History Pattern Based Power Gating Entry Decisions".
U.S. Appl. No. 14/146,588, filed Jan. 2, 2014, entitled "Configuring Processor Policies Based on Predicted Durations of Active Performance States".
U.S. Appl. No. 14/146,591, filed Jan. 2, 2014, entitled "Power Gating Based on Cache Dirtiness".
U.S. Appl. No. 14/015,578, filed Aug. 30, 2013, entitled "Prediction for Power Gating".
Final Office Action mailed May 26, 2016, for U.S. Appl. No. 14/015,578 14 pages.
Final Office Action mailed May 18, 2016, for U.S. Appl. No. 14/488,874 30 pages.
Non-Final Office Action mailed Apr. 5, 2016, for U.S. Appl. No. 14/146,591, 45 Pages.
Non-Final Office Action mailed Mar. 30, 2016 for U.S. Appl. No. 14/310,908, 37 pages.
Non-Final Office Action mailed Jun. 10, 2016 for U.S. Appl. No. 14/146,588, 49 pages.
Non-Final Office Action mailed Jul. 15, 2016 for U.S. Appl. No. 14/015,578, 19 pages.
Notice of Allowance mailed Jul. 26, 2106 for U.S. Appl. No. 14/310,908, 18 pages.
Non-Final Office Action mailed Oct. 6, 2016 for U.S Appl. No. 14/488,874, 24 pages.
Final Office Action mailed Oct. 19, 2016 for U.S. Appl. No. 14/146,591, 20 pages.
Non-Final Office Action mailed Jul. 14, 2015 for U.S. Appl. No. 14/015,578, 27 pages.
Final Office Action mailed Dec. 14, 2016 for U.S. Appl. No. 14/146,588, 29 pages.
Non-Final Office Action mailed Feb. 22, 2017 for U.S. Appl. No. 14/146,591, 25 pages.

* cited by examiner

PREDICTING POWER MANAGEMENT STATE DURATION ON A PER-PROCESS BASIS AND MODIFYING CACHE SIZE BASED ON THE PREDICTED DURATION

BACKGROUND

Field of the Disclosure

The present disclosure relates generally to processing devices and, more particularly, to power management states in processing devices.

Description of the Related Art

Components in processing devices such as central processing units (CPUs), graphics processing units (GPUs), and accelerated processing units (APUs) can be operated in different power management states in which portions of the processing device can be deactivated or run at lower operating frequencies or voltages. For example, the power management states available to a component of a processing device may include an active state in which the component can be executing instructions and the component runs at a nominal operating frequency and operating voltage, an idle state in which the component does not execute instructions and may be run at a lower operating frequency or operating voltage, and a power-gated state in which the power supply is disconnected from the component, e.g., using a header transistor that interrupts the power supplied to the component when a power-gate signal is applied to a gate of the header transistor.

Processing devices can conserve power by transitioning one or more components from the active state to the idle state (i.e., idling one or more components) when there are no activities to be performed by the component(s) of the processing device. If the component is idle for a relatively long time, power supplied to the processing device may then be gated so that no current is supplied to the component, thereby reducing stand-by and leakage power consumption. For example, a processor core in a CPU can be power gated if the processor core has been idle for more than a predetermined time interval. However, transitioning between the power management states of a component of a processing device consumes system resources and therefore incurs costs. For example, transitioning into or out of the idle state from either the active state or the power-gated state imposes a performance cost due to the delay caused by the transition and may also impose an energy cost to perform operations prior to the transition. For another example, transitioning from an idle state to a power-gated state (i.e., power gating) requires flushing caches in the processor core, which consumes both time and power. Power gating also exacts a performance cost to return the processor core to an active state.

Conventional processing devices attempt to balance the benefits and costs of transitions between power management states using predetermined global time thresholds that are applied to all the components in the processing device. For example, a low-power state is more efficient than a higher power state only if a component's residency in the low-power state is sufficiently long that power savings associated with the low-power state exceed the power consumed during entry and exit transitions to and from the low-power state. Power management may therefore be disabled so that power management state transitions are disallowed when the overall (i.e., global) rate of transitions between the power management states caused by all processes being performed by a system rises above a predetermined threshold rate at which the costs of entering and exiting the low-power state are expected to exceed the power savings achieved while the component is in the low-power state. Power management may also be disabled when a global measure of the elapsed time between the transitions (such as an average of the elapsed times between all transitions performed by the system) is below a predetermined threshold interval. Since the precise performance costs of transitions between the power management states are not known at runtime, the thresholds are calibrated based on expected power savings and costs associated with the transition.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF EMBODIMENTS

Figure 1:
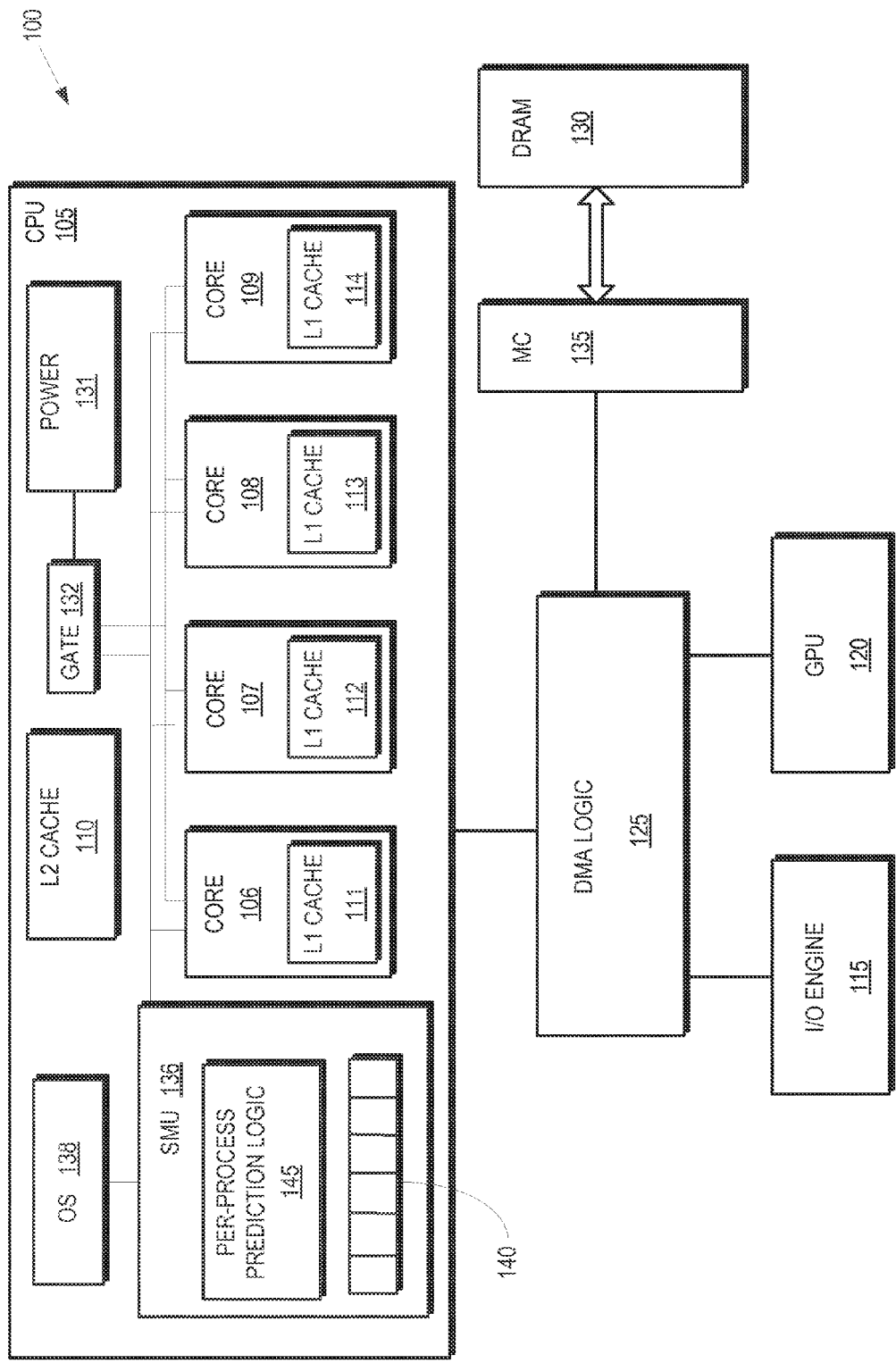
FIG. 1 is a block diagram of a processing device in accordance with some embodiments.

Processing devices can employ prediction techniques to predict how long a component is likely to spend in a particular power management state. However, different processes executing on the components of the processing device may spend different amounts of time in the different power management states. Patterns in the power management state transitions associated with individual processes may be obscured by aliasing between multiple processes that may cause a component to transition between the different power management states at different rates. For example, different processes may wake components of the system, e.g. transition the components from the idle state into the active state, at different rates, which may make it difficult or impossible to accurately detect patterns in the wake events of the individual processes. For another example, different processes may cause a component to spend different amounts of time in the idle state and on it may be difficult or impossible to predict how long a component will be idle based on global estimates of the idle time. Consequently, it may be difficult or impossible to determine whether the component can be efficiently power-gated when a process causes it to enter the idle state.

FIGS. 1-8 describe some embodiments of techniques to predict durations of power management states associated with individual processes. For example, a processing device may predict a duration of a time interval that a component of a processing device spends in a first power management state by independently tracking durations of one or more previous time intervals spent in the first power management state during execution of the individual processes. The duration of a subsequent time interval that the component is expected to spend in the first power management state during execution of one of the processes can then be predicted on the basis of a per-process history of durations of time intervals that the component spent in the first power management state. Per-process predictions are not affected by aliasing between transitions caused by different processes. Consequently, the per-process predictions are a more accurate indication of the likely duration of the time that the component may spend in a particular power management state while executing a particular process.

Some embodiments of the processing device may decide whether to transition the component into a second power management state by comparing the predicted duration to a break-even duration at which the benefits of transitioning into the second power management state exceed the costs of transitioning into the second power management state. Since the per-process prediction of the duration is more accurate than the global prediction, the processing device is less likely to transition the component between the first and second power management states in circumstances when the actual costs of the transition exceed the benefits. Furthermore, transitions between the first and second power management states are more likely to conserve power and/or improve performance of the processing device.

FIG. 1 is a block diagram of a processing device 100 in accordance with some embodiments. The processing system 100 includes a central processing unit (CPU) 105 for executing instructions. Some embodiments of the CPU 105 include multiple processor cores 106-109 that can independently execute instructions concurrently or in parallel. The CPU 105 shown in FIG. 1 includes four processor cores 106-109. However, persons of ordinary skill in the art having benefit of the present disclosure should appreciate that the number of processor cores in the CPU 105 is a matter of design choice. Some embodiments of the CPU 105 may include more or fewer than the four processor cores 106-109 shown in FIG. 1.

The CPU 105 implements caching of data and instructions and some embodiments of the CPU 105 may therefore implement a hierarchical cache system. For example, the CPU 105 may include an L2 cache 110 for caching instructions or data that may be accessed by one or more of the processor cores 106-109. Each of the processor cores 106-109 may also implement an L1 cache 111-114. Some embodiments of the L1 caches 111-114 may be subdivided into an instruction cache and a data cache. Some embodiments of the CPU 105 may also include other hardware such as branch predictor arrays, reservation stations, load queues, store queues, and the like.

The processing system 100 includes an input/output engine 115 for handling input or output operations associated with elements of the processing system such as keyboards, mice, printers, external disks, and the like. A graphics processing unit (GPU) 120 is included in the processing system 100 for creating visual images intended for output to a display. Some embodiments of the GPU 120 may include multiple cores and/or cache elements that are not shown in FIG. 1 interest of clarity.

The processing system 100 shown in FIG. 1 includes direct memory access (DMA) logic 125 for generating addresses and initiating memory read or write cycles. The CPU 105 may initiate transfers between memory elements in the processing system 100 such as the DRAM memory 130 and/or other entities connected to the DMA logic 125 including the CPU 105, the I/O engine 115 and the CPU 120. Some embodiments of the DMA logic 125 may also be used for memory-to-memory data transfer or transferring data between the cores 106-109. The CPU 105 can perform other operations concurrently with the data transfers being performed by the DMA logic 125, which may provide an interrupt to the CPU 105 to indicate that the transfer is complete.

A memory controller (MC) 135 may be used to coordinate the flow of data between the DMA logic 125 and the DRAM 130. The memory controller 135 includes logic used to control reading information from the DRAM 130 and writing information to the DRAM 130. The memory controller 135 may also include refresh logic that is used to periodically re-write information to the DRAM 130 so that information in the memory cells of the DRAM 130 is retained.

Some embodiments of the CPU 105 may implement a system management unit (SMU) 136 that may be used to carry out policies set by an operating system (OS) 138 of the CPU 105. For example, the SMU 136 may be used to manage thermal and power conditions in the CPU 105 according to policies set by the OS 138 and using information that may be provided to the SMU 136 by the OS 138, such as power consumption by entities within the CPU 105 or temperatures at different locations within the CPU 105. The SMU 136 may therefore be able to control power supplied to entities such as the cores 106-109, as well as adjusting operating points of the cores 106-109, e.g., by changing an operating frequency or an operating voltage supplied to the cores 106-109. The components of the processing device 100 such as the CPU 105, processor cores 106-109, the I/O engine 115, the CPU 120, OR the DMA logic 125 may implement one or more power management states such as an active state, an idle state, and a power-gated state. The SMU 136 may be able to control transitions between the different power management states, as discussed herein.

Some embodiments of the SMU 136 include one or more storage devices that are used to store data structures 140 that may include, for each of the processes that are executed by components of the processing device 100, information indicating corresponding previous durations of the power management state(s). Some embodiments of the processing device 100 may implement some or all of the data structures 140 in different locations. The SMU 136 also includes a per-process prediction logic 145 that is used to predict subsequent durations of the power management state(s) for the components of the processing device 100 on a per-process basis using information stored in the data structures 140. For example, if the CPU 105 enters (or is about to enter) the idle state while processing instructions or operations associated with a first process, the SMU 136 may access a portion of the data structure 140 that stores a predetermined number of previous durations of the power management state associated with the first process. The accessed values may then be used to predict the duration of the idle state.

The SMU 136 may use the predicted duration of the idle state to decide whether to transition between different power management states. For example, the SMU 136 can decide whether to transition the CPU 105 from an active state into an idle state by comparing the predicted duration of the idle state for the first process to a break-even duration at which the benefits of transitioning into the idle state exceed the costs of transitioning into the idle state. This may allow the use of more aggressive power savings techniques without the commensurate performance loss due to errors in the predicted durations because the predicted durations are more accurate and the power savings techniques do not need to include as large of a margin to account for errors in the predicted durations. For another example, the SMU 136 may track the active state duration of each process and predict the duration of active state associated with different processes if the processing device supports dynamic sizing of hardware resources, e.g., by selectively enabling portions of the hardware resources, the predicted durations of active state associated with the different processes can be used to determine the sizes of enabled portions of hardware resources such as the L2 cache 110, the L1 caches 111-114, as well as other hardware such as branch predictor arrays, reservation station entries, load/store queue entries, or other hardware structures that may be turned on or enabled so that they consume power during the active state.

The SMU 136 can transition components of the processing system 100 such as the CPU 105, the GPU 120, or the cores 106-109 from the active state or the idle state into the power-gated state to conserve power. For example, some embodiments of the processing system 100 include a power supply 131 that is connected to gate logic 132. The gate logic 132 can control the power supplied to the cores 106-109 and can gate the power provided to one or more of the cores 106-109, e.g., by opening one or more circuits to interrupt the flow of current to one or more of the cores 106-109 in response to signals or instructions provided by the SMU 136. However, power gating components of the processing system 100 consumes system resources. For example, power gating the CPU 105 or the cores 106-109 may require flushing some or all of the L2 cache 110 and the L1 caches 111-114. Flushing one or more of the caches 110-114 consumes both time and power. Reentering the active state after being power gated also consumes significant resources of the processing system 100. Before deciding whether to power gate the component(s), the resource savings resulting from power gating one or more components of the processing system 100 is therefore weighed against the resource cost of power gating these components and subsequently reentering the active state.

Some embodiments of the SMU 136 include per-process prediction logic 145 that uses the information in the data structures 140 to predict the duration of the idle state on a per-process basis. The cost and benefits of power-gating a component may then be weighed based on the predicted duration and the power management state may be changed if the benefits outweigh the costs. For example, if a process is being performed by the processor core 106 and the process causes the processor core 106 to enter the idle state, the per-process prediction logic 145 may predict the duration of the idle state using information in the data structures 140 that indicates previous durations of idle states generated in one or more of the processor cores 106-109 by the process. The SMU 136 may then use the predicted duration to estimate the expected benefits of transitioning the processor core 106 to a different power management state such as a power-gated state. The SMU 136 may also estimate the cost of the transition. If the benefits are greater than the costs, the SMU 136 may place the processor core 106 into the power-gated state, e.g., by providing signaling to the gate 132 and the core 106.

In some embodiments, the predicted durations may be used to make other power management decisions. For example, the predicted durations may be used to control the duration of a timer that is used to control cache-flush-on-hold operations. The timer may be set to a low value when the predicted durations are smaller than a threshold and the tinier may be set to a high value when the predicted durations are larger than a threshold.

Figure 2:
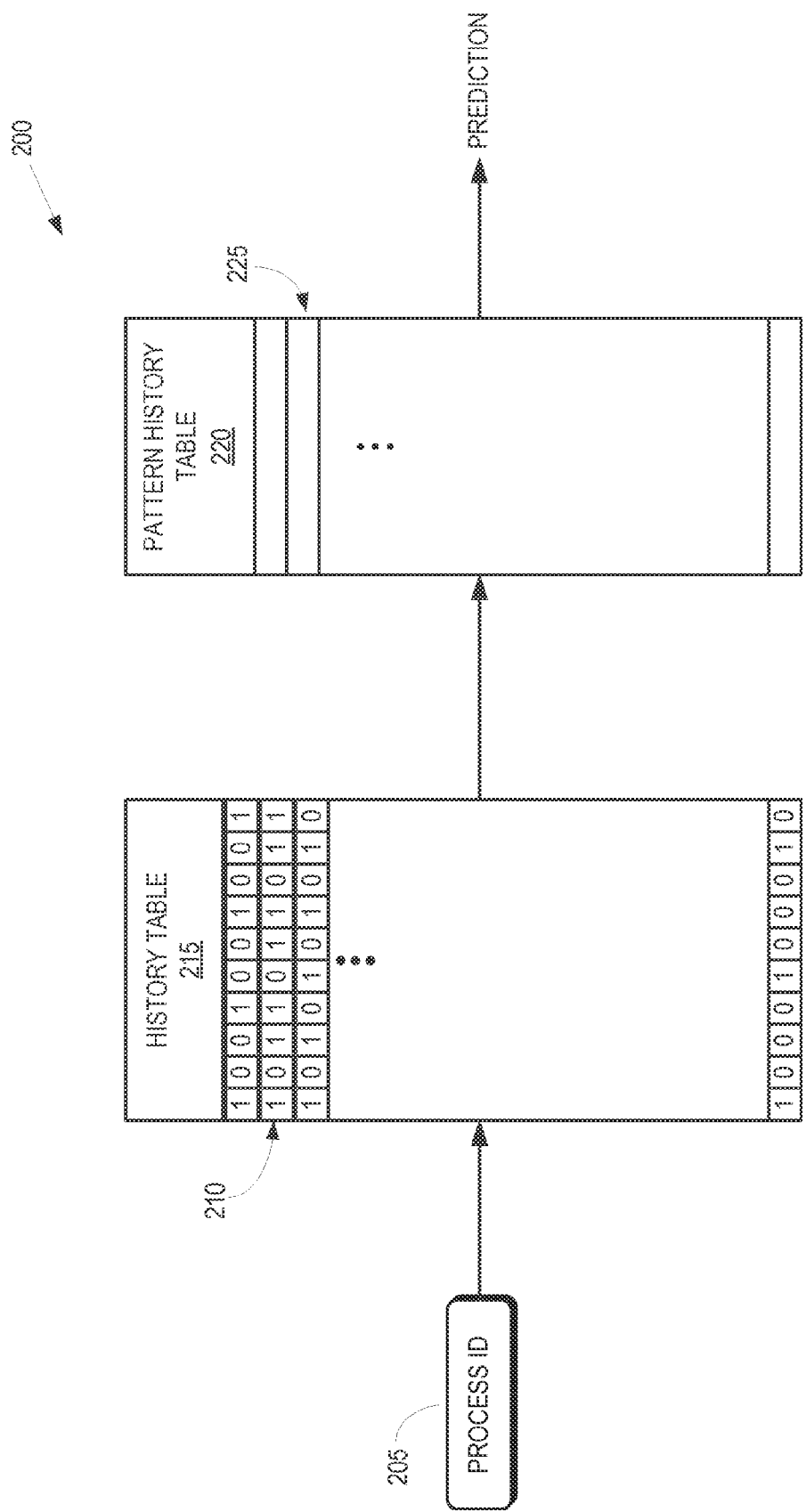
FIG. 2 is a diagram of a two-level adaptive local predictor that may be used in the prediction logic shown in FIG. 1 to predict power management state durations on a per-process basis in accordance with some embodiments.

FIG. 2 is a diagram of a two-level adaptive local predictor 200 that may be used in the prediction logic 145 shown in FIG. 1 to predict power management state durations on a per-process basis in accordance with some embodiments. The two levels used by the predictor 200 correspond to long and short durations of a power management state duration such as the duration of an idle time event. For example, a value of "1" may be used to indicate an idle time event that has a duration that is longer than a threshold and a value of "0" may be used to indicate an idle time event that has a duration that is shorter than the threshold. The threshold may be set based on the breakeven duration discussed herein. Some embodiments may use additional granularity in the pattern history, e.g., two bits may be used for each idle time event and values of "11," "10," "01," and "00" may indicate progressively shorter durations of the idle time event. These embodiments may be used to predict one of several idle duration ranges, which may then be used to drive selection of different power management states.

The predictor 200 receives a process identifier 205 that can be used as an index to identify a pattern history entry 210 corresponding to a row in a history table 215. Some embodiments may use a hashed value of the process identifier 205 as the index into the history table 215. Each pattern history entry 210 is associated with a process and includes a history that indicates whether a predetermined number of previous idle event durations associated with the corresponding process were long or short. Some embodiments of the history table 215 may implement the pattern history entries 210 using a shift register that shifts in the bit that represents the most recent idle duration and shifts out the bit representing the least recent idle duration.

A pattern history table 220 includes $2^N$ entries 225 that correspond to each possible combination of long and short durations in the N idle time events in each of the entries 210. Some embodiments of the local predictor 200 may include a separate pattern history table 220 for each process. The pattern history entry 210 that is selected from the history table 215 using the process identifier 205 may then be used as an index into the pattern history table 220. Some embodiments may use a hashed value of the pattern history entry 210 as the index into the pattern history table 220.

Each entry 225 in the pattern history table 220 is associated with a saturating counter that can be incremented or decremented to reflect the likelihood that a pattern 210 associated with a process identifier 205 indicates that a duration of a subsequent power management state will be long or short. An entry 225 may be incremented when the pattern associated with the entry 210 for a particular process identifier 205 is followed by a long-duration event for the same process. The saturating counter can be incremented until the saturating counter saturates at a maximum value (e.g., all "1s") that indicates that the current pattern history 210 for the process identifier 205 is very likely to be followed by a long duration idle event. An entry 225 may be decremented when the pattern associated with the entry 210 for the process identifier 205 is followed by a short-duration event. The saturating counter can be decremented until the saturating counter saturates at a minimum value (e.g., all "0s") that indicates that the current pattern history entry 210 is very likely to be followed by a short duration idle event.

The predictor 200 may predict that an idle event is likely to be a long-duration event when the saturating counter in an entry 225 that is indexed by the pattern history entry 210 (or a hashed value thereof) associated with the process identifier 205 has a relatively high value of the saturating counter such as a value that is close to the maximum value. The predictor 200 may predict that an idle event is likely to be a short-duration event when the saturating counter in an entry 225 that is indexed by the pattern history entry 210 (or a hashed value thereof) associated with the process identifier 205 has a relatively low value of the saturating counter such as a value that is close to the minimum value. The per-process prediction logic 145 shown in FIG. 1 may then use the saturating counters to predict a long-duration or a short duration of the power management states associated with the different processes.

Some embodiments of the predictor 200 may also provide a confidence measure that indicates a degree of confidence in the current prediction. For example, a confidence measure can be derived by counting the number of entries 225 that are close to being saturated e.g., are close to the maximum value of all "1s" or the minimum value of all "0s") and comparing this to the number of entries 225 that do not represent a strong bias to long or short duration idle time events (e.g., values that are approximately centered between the maximum value of all "1s" and the minimum value of all "0s"). If the ratio of saturated to unsaturated entries 225 is relatively large, the confidence measure indicates a relatively high degree of confidence in the current prediction and if this ratio is relatively small, the confidence measure indicates a relatively low degree of confidence in the current prediction. The SMU 136 shown in FIG. 1 may then use the predicted duration, as well as the confidence measure, to decide whether to transition between power management states, as discussed herein. For example, the SMU 136 may only use the predicted long or short duration if the confidence measure indicates a relatively high degree of confidence in the current prediction.

Figure 3:
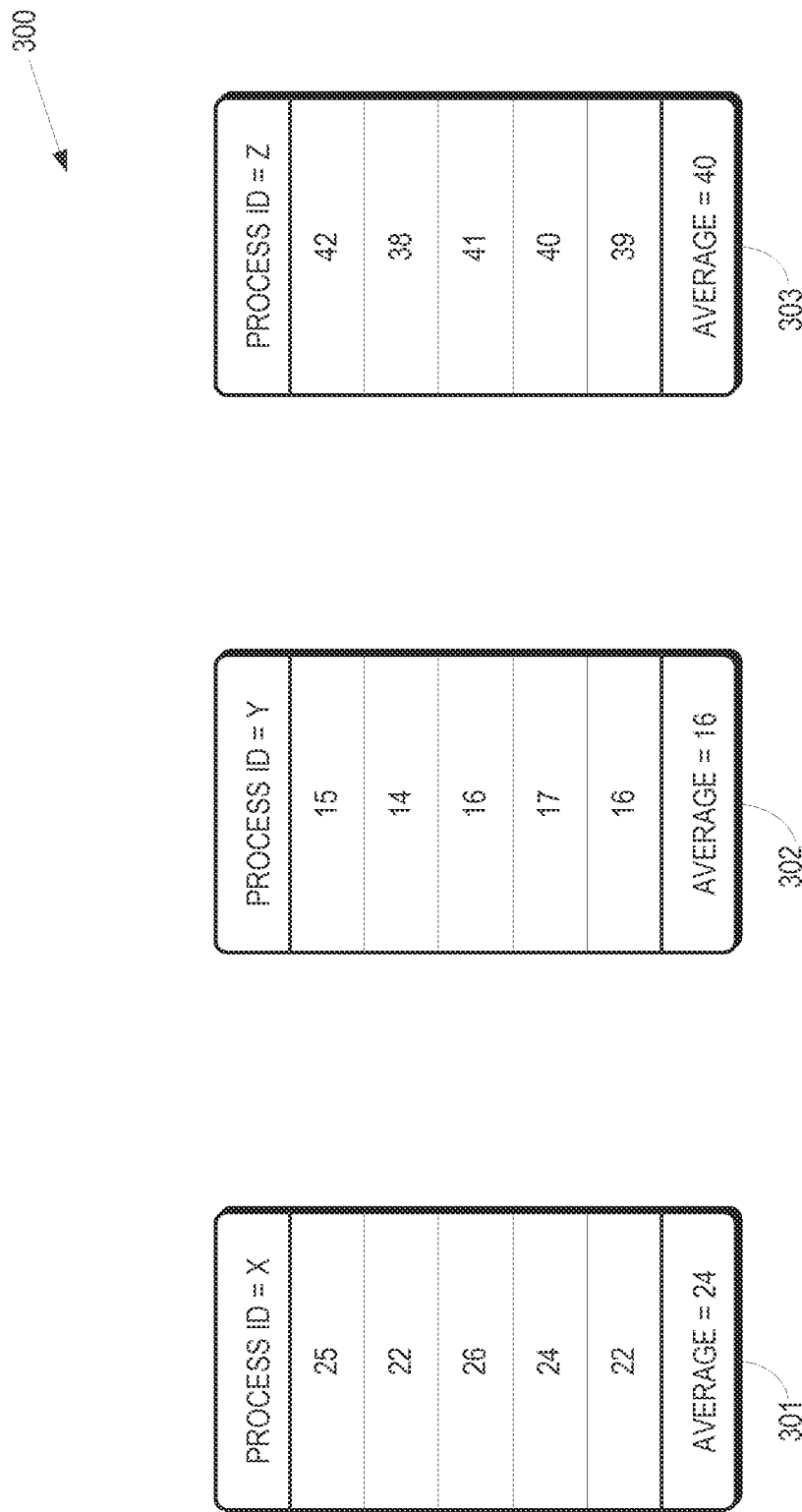
FIG. 3 is a block diagram of a data structure that may be used to implement the data structures shown in FIG. 1 according to some embodiments.

FIG. 3 is a block diagram of a data structure 300 that may be used as one or more of the data structures 140 shown in FIG. 1 according to some embodiments. Some embodiments of the data structure 300 may be implemented in a storage device such as a memory element. The data structure 300 shown in FIG. 3 includes portions 301-303 that are used to store durations of a power management state such as an idle state associated with different processes. The portions 301-303 may therefore be indexed by the process identifiers of process X, process Y, and process Z. More or fewer portions may be implemented in the data structure 300 to accommodate more or fewer processes. Each of the portions 301-303 include a predetermined number of durations. For example, the portion 301 includes the previous five durations (25, 22, 26, 24, 22) of idle states associated with process X. The durations may be measured in units of time or in processor cycles. Entries in the portion 301 may be updated as each idle state event associated with the process resolves, e.g., the duration of the recently resolved idle state event may be added to the portion 301 and the duration of the oldest resolved idle state event may be removed from the portion 301.

Some embodiments of the portions 301-303 may also include information indicating the average value of the durations in the portions 301-303. For example, the portion 301 indicates the average value (24) of the five durations in the entries of the portion 301. However, including information indicating the average value of the durations is optional and may not be included in some embodiments of the data structure 300. In that case, the average value may be computed as necessary. Some embodiments of the portions 301-303 may also include information indicating other statistical properties of the durations in the portions 301-303 such as moving averages, medians, modes, frequency distributions, standard deviations, or other forms of accounting that gives a representation of a typical duration of the power management state. The standard deviation of the distribution of durations in the portions 301-303 may be used as a confidence measure for durations that are predicted on the basis of the previous durations stored in the portions 301-303. The per-process prediction logic 145 shown in FIG. 1 may then use the average values as the predicted values of durations of the power management states associated with the different processes. The SMU 136 shown in FIG. 1 may use the predicted duration, as well as the confidence measure, to decide whether to transition between power management states, as discussed herein. For example, the SMU 136 may only use the predicted duration if the confidence measure indicates a relatively high degree of confidence in the current prediction.

Figure 4:
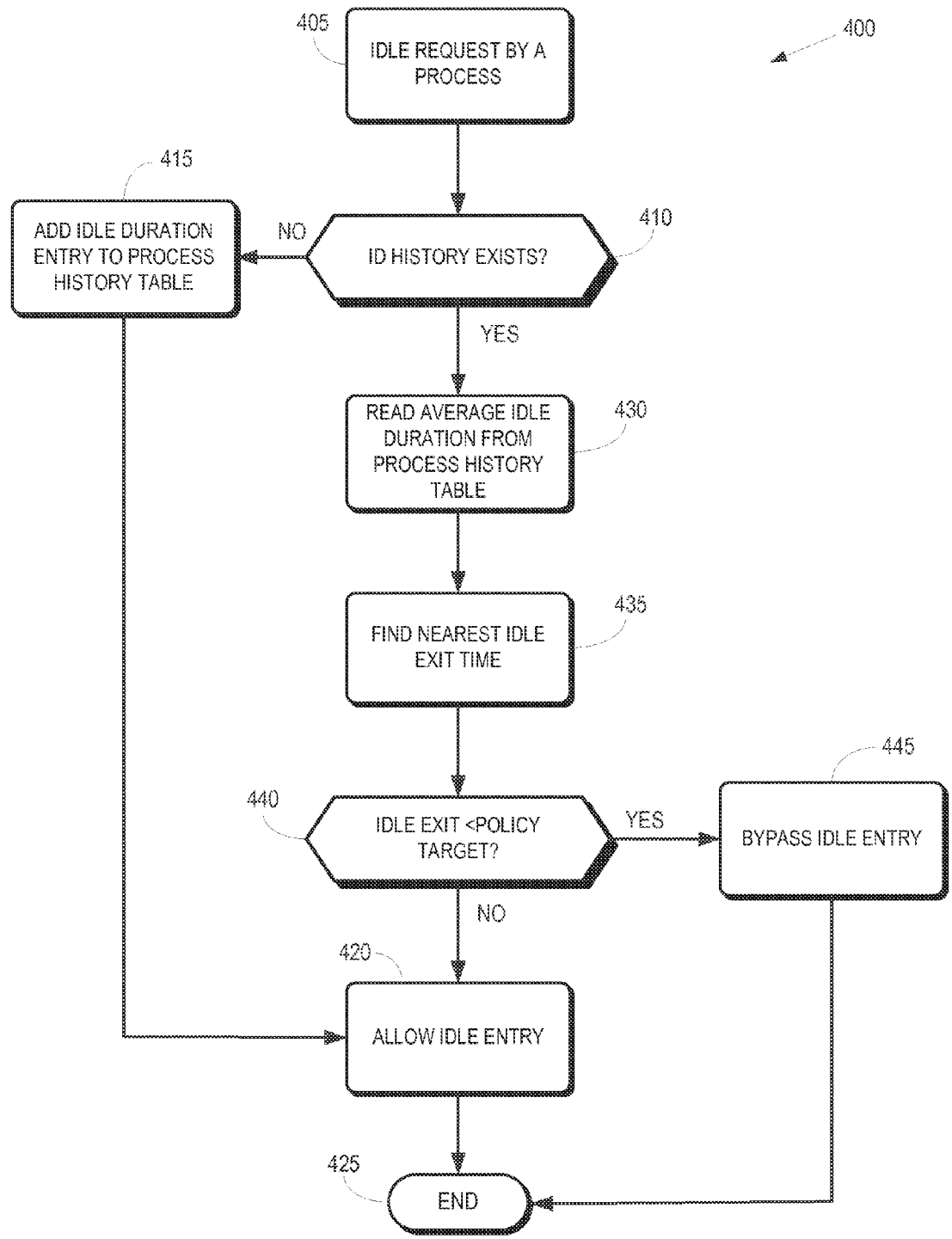
FIG. 4 is a flow diagram of a method of determining whether to allow a component of a processing device to enter an idle state based on a predicted duration of the idle state in accordance with some embodiments.

FIG. 4 is a flow diagram of a method 400 of determining whether to allow a component of a processing device to enter an idle state based on a predicted duration of the idle state in accordance with some embodiments. Some embodiments of the method 400 may be implemented in the per-process prediction logic 145 shown in FIG. 1. The method 400 begins at block 405 in response to a process generating an idle request that, if granted, causes the component of the processing device to transition from an active state to an idle state. At decision block 410, the prediction logic determines whether a process history table includes a duration history that is indexed by the process identifier (ID) of the process that generated the idle request. If not, the prediction logic can add an idle duration entry to the process history table at block 415. The added idle duration entry is indexed by the process identifier of the process and can be used to store durations of the requested idle event and subsequent idle events. At block 420, the prediction logic grants the idle request so that the component of the processing device transitions from the active state to the idle state. The method 400 may end at block 425.

If the prediction logic determines (at decision block 410) that the process history table includes a duration history indexed by the process identifier of the process that generated the idle request, then the prediction logic reads the average idle duration for the process from the corresponding duration history in the process history table at block 430. However, it is not necessary for the average idle duration to be read from the process history table. Some embodiments may read other statistical representations of the typical idle duration or may calculate the statistical representations based on the durations stored in the duration history. The average idle duration (or other statistical representation of the typical idle duration) may be added to the current time to predict when the requested idle event may end. In some embodiments, components of the processing device may only be able to re-activate or transition out of the idle state at predetermined exit times. At block 435, the prediction logic may therefore find the idle exit time that is nearest to the predicted end of the requested idle event.

At decision block 440, the prediction logic determines whether the idle exit time is earlier (i.e., less than) than a policy target exit time. Some embodiments of the prediction logic may set the policy target exit time based on a comparison of the system resources that may be consumed on entry and exit from the idle state to the system resources that may be saved by entering the idle state for a time interval that extends from the current time to the nearest idle exit time. If the idle exit time is earlier than the policy target exit time, indicating that the resource savings would be largely offset or negated by the resources consumed to enter and exit the idle state, the idle request may not be granted and entry into the idle state may be bypassed at block 445. The method 400 may then end at block 425. If the idle exit time is later than (i.e., greater than) the policy target exit time, indicating that a resource savings would be achieved even after accounting for the resources consumed to enter and exit the idle state, the idle request may be granted to allow entry into the idle state at block 420. The method may then end at block 425.

Some embodiments of the method 400 may also be used to decide whether to make other transitions between power management states. For example, the predicted idle event duration or idle state exit time may be used to decide whether to power gate the component of the processing device based on a comparison of the resource cost and resource savings associated with power gating the component, as discussed herein.

Figure 5:
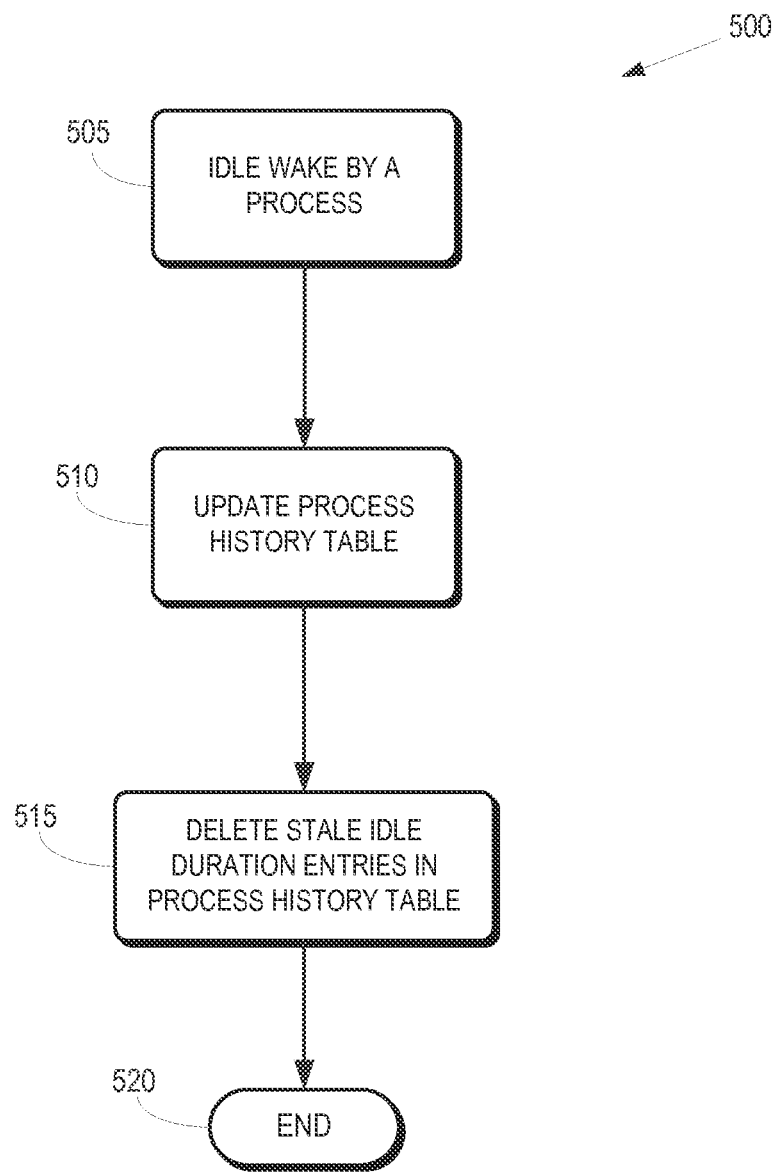
FIG. 5 is a flow diagram of a method of maintaining an idle event duration process history table in accordance with some embodiments.

FIG. 5 is a flow diagram of a method 500 of maintaining an idle event duration process history table in accordance with some embodiments. Some embodiments of the method 500 may be implemented in the per-process prediction logic 145 and used to maintain process history tables stored in the data structures 140 shown in FIG. 1. At block 505, a process wakes a component of a processing device from an idle state so that the component enters an active state. At block 510, a portion of the process history table that is indexed by a process identifier of the process is updated. For example, the prediction logic may determine the duration of the idle event that is resolved by waking the component and may add this duration to the corresponding portion of the process history table. An oldest or stale duration in the corresponding portion of the process history table may be deleted at block 515 to maintain the predetermined number of durations. Some embodiments may also update other parameters such as parameters used to define the statistical representation of the average or typical duration of an idle event for this process. The method 500 may then end at block 520.

Figure 6:
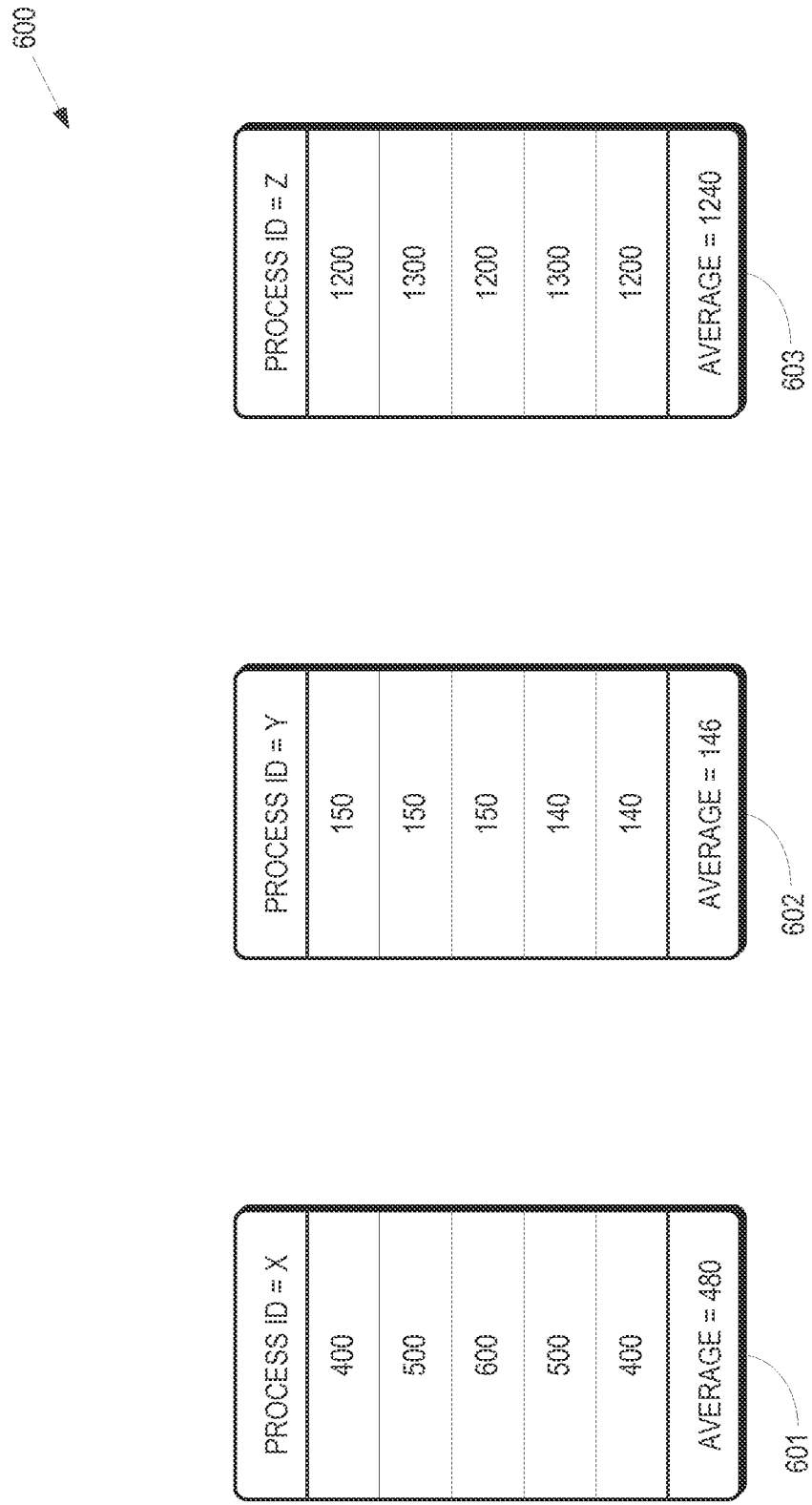
FIG. 6 is a block diagram of a data structure that may be used as one or more of the data structures shown in FIG. 1 according to some embodiments.

FIG. 6 is a block diagram of a data structure 600 that may be used to implement the data structures 140 shown in FIG. 1 according to some embodiments. The data structure 600 shown in FIG. 6 includes portions 601-603 that are used to store durations of a power management state such as an active state associated with different processes. The portions 601-603 may therefore be indexed by the process identifiers of process X, process Y, and process Z. More or fewer portions may be implemented in the data structure 600 to accommodate more or fewer processes. Each of the portions 601-603 include a predetermined number of durations. For example, the portion 601 includes the previous five durations (400, 500, 600, 500, 400) of active states associated with process X. The durations may be measured in units of time or processor cycles. Entries in the portion 601 may be updated as each active state event associated with the process resolves. For example, the duration of the active state may equal the length of time between idle state events. This duration may be added to the portion 601 in response to the component entering an idle state and the duration of the oldest resolved active state event may be removed from the portion 601.

Some embodiments of the portions 601-603 may also include information indicating the average value of the durations in the portions 601-603. For example, the portion 601 indicates the average value (480) of the five durations in the entries of the portion 601. However, including information indicating the average value of the durations is optional and may not be included in some embodiments of the data structure 600. In that case, the average value may be computed as necessary. Some embodiments of the portions 601-603 may also include information indicating other statistical properties of the durations in the portions 601-603 such as moving averages, medians, modes, frequency distributions, standard deviations, or other forms of accounting that gives a representation of a typical duration of the power management state. The standard deviation of the distribution of durations in the portions 601-603 may be used as a confidence measure for durations that are predicted on the basis of the previous durations stored in the portions 601-603. The per-process prediction logic 145 shown in FIG. 1 may then use the average durations as a predicted duration of the power management states of the different processes.

Figure 7:
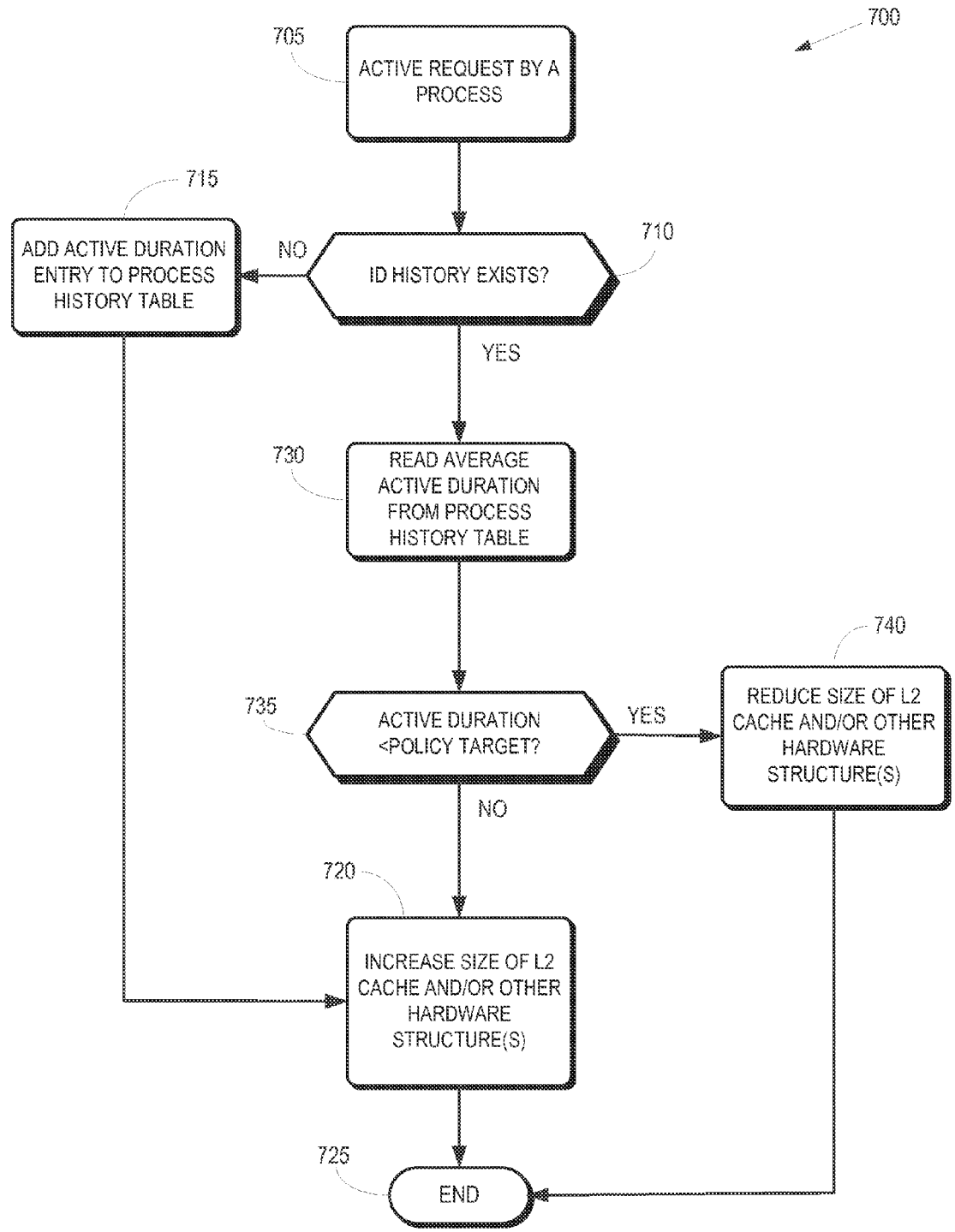
FIG. 7 is a flow diagram of a method of determining whether to modify a number of available resources for a module of a processing device based on a predicted duration of the active state in accordance with some embodiments.

FIG. 7 is a flow diagram of a method 700 of determining whether to modify sizes of hardware structures in a processing device based on a predicted duration of the active state in accordance with some embodiments. Some embodiments of the method 700 may be implemented in the per-process prediction logic 145 shown in FIG. 1. The method 700 begins at block 705 in response to a process generating an active request that, if granted, causes the component of the processing device to transition from an idle state (or power-gated state) to an active state. At decision block 710, the prediction logic determines whether a process history table includes a duration history that is indexed by the process identifier (ID) of the process that generated the active request. If not, the prediction logic can add an active duration entry to the process history table at block 715. The added active duration entry is indexed by the process identifier of the process and can be used to store active durations for the process. At block 720, the size of an L2 cache or other hardware structures in the processing device may be increased and the component of the processing device transitions from the idle state to the active state. The method 700 may end at block 725.

If the prediction logic determines (at decision block 710) that the process history table includes a duration history indexed by the process identifier of the process that generated the active request, then the prediction logic reads the average active duration for the process from the corresponding duration history in the process history table at block 730. However, it is not necessary for the average active duration to be read from the process history table. Some embodiments may read other statistical representations of the typical active duration or may calculate the statistical representations based on the durations stored in the duration history.

At decision block 735, the prediction logic determines whether the predicted active duration is less than a policy target for the active duration. If the active duration is less than the policy target duration, indicating that the process may keep the component of a processing device awake for a short time and may therefore not consume a large portion of system resources, the size of an enabled portion of the L2 cache and/or other hardware structures in the processing device may be reduced at block 740. The method 700 may then end at block 725. If the active duration is greater than the policy target duration, indicating that the process may keep the component of the processing device awake for a relatively long time and may therefore consume a significant portion of system resources, the size of the L2 cache and/or other hardware structures in the processing device may be increased at block 720. The method 700 may then end at block 725.

Figure 8:
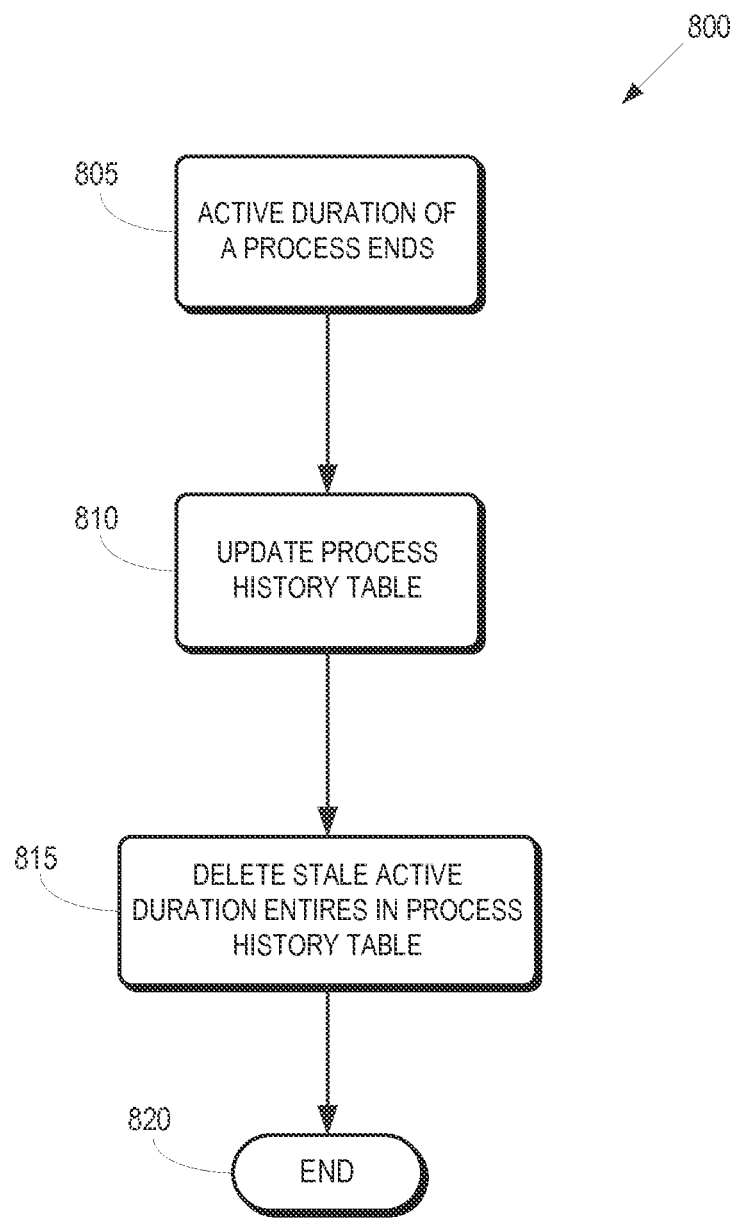
FIG. 8 is a flow diagram of a method of maintaining an active duration process history table in accordance with some embodiments.

FIG. 8 is a flow diagram of a method 800 of maintaining an active duration process history table in accordance with some embodiments. Some embodiments of the method 800 may be implemented in the per-process prediction logic 145 and used to maintain process history tables stored in the data structures 140 shown in FIG. 1. At block 805, a process leaves the active state, e.g., by entering an idle state or a power-gated state. At block 810, a portion of the process history table that is indexed by a process identifier of the process is updated. For example, the prediction logic may determine the duration of the active state that ends when the component enters an idle state and may add this duration to the corresponding portion of the process history table. An oldest or stale duration in the corresponding portion of the process history table may be deleted at block 815 to maintain the predetermined number of durations. Some embodiments may also update other parameters such as parameters used to define the statistical representation of the average or typical duration of an active state for this process. The method 800 may then end at block 820.

In some embodiments, the apparatus and techniques described above are implemented in a system comprising one or more integrated circuit (IC) devices (also referred to as integrated circuit packages or microchips), such as the prediction logic described above with reference to FIGS. 1-8. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage NAS)).

Figure 9:
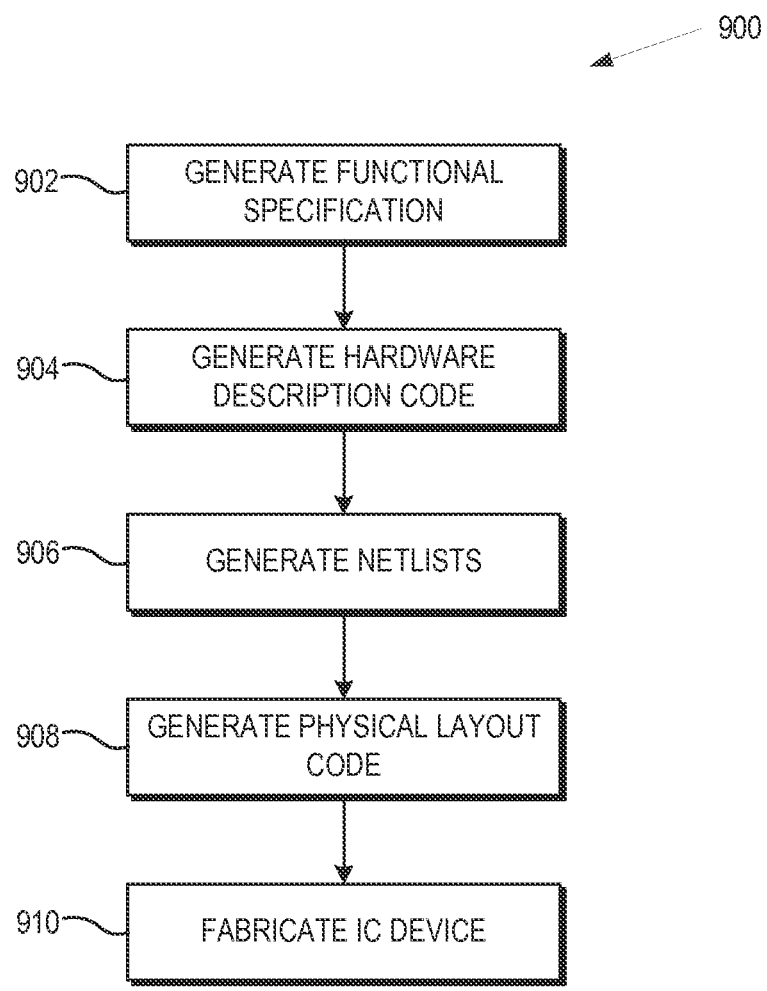
FIG. 9 is a flow diagram illustrating a method for designing and fabricating an integrated circuit device implementing at least a portion of a component of a processing system in accordance with some embodiments.

FIG. 9 is a flow diagram illustrating an example method 900 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 902 a functional specification for the IC device is generated. The functional specification (often referred to as a micro architecture specification (MAS)) may be represented by any of a variety of programming languages or modeling languages, including C, C++, SystemC, Simulink, or MATLAB.

At block 904, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 906 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 908, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist (s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 910, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   storing, in at least one data structure associated with at least one process executed by a component of a processing device, information indicating at least one previous duration of a power management state associated with said at least one process;
   predicting a subsequent duration of the power management state for said at least one process using information stored in said at least one data structure;
   selectively modifying the power management state of the component based on the predicted subsequent duration; and
   selectively modifying a size of at least one hardware structure in response to selectively modifying the power management state, wherein the power management state is an active state during which instructions or operations associated with said at least one process can be executed by the component, and wherein selectively modifying the size of the at least one hardware structure comprises enabling a portion of at least one cache for the component to increase the size of the at least one cache based on the predicted subsequent duration of the active state for said at least one process.

2. The method of claim 1, wherein selectively modifying the power management state comprises transitioning the power management state of the component to an idle state during which instructions or operations associated with said at least one process are not being executed by the component, and wherein selectively modifying the size of the at least one hardware structure comprises decreasing a size of at least one cache for the component in response to transitioning the power management state of the component to the idle state.

3. The method of claim 2, wherein selectively modifying the power management state comprises transitioning the component from an active state into the idle state based on the predicted subsequent duration of the idle state for said at least one process.

4. The method of claim 2, wherein selectively modifying the power management state comprises transitioning the component from the idle state to a power-gated state in response to the predicted subsequent duration for said at least one process being longer than a breakeven duration at which predicted savings from power gating the component for the predicted subsequent duration exceed a cost of power gating the component, and wherein selectively modifying the size of the at least one cache comprises decreasing the size of the at least one cache in response to power gating the component.

5. The method of claim 1, wherein storing the information indicating the previous durations in said at least one data structure comprises storing durations of the power management state associated with said at least one process in at least one table indexed by at least one process identifier of said at least one process, and wherein predicting the subsequent duration of the power management state for said at least one process comprises predicting the subsequent duration of the power management state using an average of the durations stored in said at least one table.

6. The method of claim 1, wherein storing the information indicating the previous durations in said at least one data structure comprises storing information indicating patterns of a predetermined number of previous durations of the power management state associated with said at least one process in a history table that is indexed by process identifier, and wherein predicting the subsequent duration of the power management state for said at least one process comprises selecting a pattern of previous durations of the power management state associated with said at least one process from the history table using a process identifier of said at least one process.

7. The method of claim 6, wherein predicting the subsequent duration of the power management state for said at least one process comprises predicting the subsequent duration of the power management state using a saturating counter that indicates a likelihood of a subsequent duration, wherein the saturating counter is selected from a plurality of saturating counters based on the pattern of the previous durations of the power management state associated with said at least one process.

8. A processing device comprising:
 a processor;
 a storage device to store at least one data structure associated with at least one process to execute on the processor, wherein said at least one data structure stores information for said at least one process, said information indicating previous durations of a power management state for said at least one process;
 prediction logic to predict a subsequent duration of the power management state of the processor using information stored in said at least one data structure and selectively modify the power management state of the processor based on the predicted subsequent duration; and
 at least one hardware structure, wherein the prediction logic is configured to modify a size of the at least one hardware structure in response to selective modification of the power management state of the processor, wherein the power management state is an active state during which instructions or operations associated with said at least one process can be executed by the processor, wherein the at least one hardware structure comprises at least one cache, and wherein the prediction logic is configured to enable a portion of the at least one cache to increase the size of the at least one cache based on the predicted subsequent duration of the active state for said at least one process.

9. The processing device of claim 8, wherein the prediction logic is configured to transition the power management state of the processor into an idle state during which instructions or operations associated with said at least one process are not being executed by the processor, wherein the at least one hardware structure comprises at least one cache, and wherein the prediction logic is configured to decrease a size of the at least one cache in response to transitioning the power management state of the processor into the idle state.

10. The processing device of claim 9, wherein the prediction logic is further configured to transition the processor from an active state into the idle state based on the predicted subsequent duration of the idle state for the processor.

11. The processing device of claim 9, wherein the prediction logic is further configured for transitioning the processor from the idle state to a power-gated state in response to the predicted subsequent duration being longer than a breakeven duration at which predicted savings from power gating the processor for the predicted subsequent duration exceed a cost of power gating the processor, and wherein the prediction logic is configured to decrease the size of the at least one cache in response to power gating the processor.

12. The processing device of claim 8, wherein said at least one data structure comprises at least one table indexed by at least one process identifier that identifies said at least one process, and wherein the prediction logic is to predict the subsequent duration of the power management state of the processor using an average of the durations stored in said at least one table indexed by a process identifier of said at least one process.

13. The processing device of claim 8, wherein said at least one data structure comprises a history table that is indexed by process identifier and a pattern history table comprising a plurality of saturating counters indexed by a pattern of previous durations of the power management state, wherein the prediction logic is to select a pattern of previous durations of the power management state associated with said at least one process from the history table using a process identifier of said at least one process.

14. The processing device of claim 13, wherein the prediction logic is to pattern history table using the selected pattern of previous durations and predict the subsequent duration of the power management state using the saturating counter.

15. A non-transitory computer readable storage medium embodying a set of executable instructions, the set of executable instructions to manipulate a computer system to perform a portion of a process to fabricate at least part of a processing device, the processing device comprising:
 a processor;
 a storage device configured for storing a plurality of data structures associated with a corresponding plurality of processes to be executed by the processor, wherein each of the plurality of data structures stores information for one of the plurality of processes, said information indicating previous durations of a power management state for said one of the plurality of processes; and
 prediction logic configured to predict a subsequent duration of the power management state of the processor using information stored in a corresponding one of the plurality of data structures and selectively modify the power management state of the processor based on the predicted subsequent duration, and wherein the prediction logic is configured to selectively modify a size of at least one hardware structure in response to selectively modifying the power management state, wherein the power management state is an active state during which instructions or operations associated with said at least one process can be executed by the processor, wherein the plurality of data structures comprises at least one cache, and wherein the prediction logic is configured to enable a portion of the at least one cache to increase the size of the at least one cache based on the predicted subsequent duration of the active state for said at least one process.

16. The non-transitory computer readable storage medium of claim 15, embodying a set of executable instructions to manipulate the computer system to perform a portion of a process to fabricate at least part of a processing device comprising the processor, wherein the prediction logic is configured to transition the power management state of the processor into an idle state during which instructions or operations associated with the plurality of processes are not being executed by the processor, wherein the at least one hardware structure comprises at least one cache, and wherein the prediction logic is configured to decrease a size of the at least one cache in response to transitioning the power management state of the processor into the idle state.

17. The non-transitory computer readable storage medium of claim 15, embodying a set of executable instructions to manipulate the computer system to perform a portion of a process to fabricate at least part of a processor comprising at least one hardware structure, and wherein the power management state of the processor is an active state during which instructions or operations associated with said at least one process can be executed by the processor, wherein the at least one hardware structure comprises at least one cache, and wherein the prediction logic is configured to enable a portion of the at least one cache to increase the size of the at least one cache based on the predicted subsequent duration of the active state for said at least one process.

18. The non-transitory computer readable storage medium of claim 15, embodying a set of executable instructions to manipulate the computer system to perform a portion of a process to fabricate at least part of a processor, wherein the plurality of data structures comprise at least one table indexed by at least one process identifier that identifies said at least one process.

\* \* \* \* \*